Dec. 26, 1967    H. TURNER, JR    3,360,154

LOCK SCARF CLOSURE

Filed Dec. 22, 1965

INVENTOR.
HARLAN TURNER, JR.

BY

*Brumbaugh, Free, Graves & Donohue* his    ATTORNEYS

United States Patent Office 3,360,154
Patented Dec. 26, 1967

3,360,154
LOCK SCARF CLOSURE
Harlan Turner, Jr., Waterford, Conn., assignor to General Dynamics Corporation, New York, N.Y., a corporation of Delaware
Filed Dec. 22, 1965, Ser. No. 515,623
6 Claims. (Cl. 220—46)

This invention relates to closures for pressure vessels; more specifically, it relates to apparatus for closing relatively large openings in pressure vessels and the like.

A number of methods are presently employed for closing large openings in metal pressure vessels to which access is from time to time required. One such method is to cut an opening each time access is desired and reweld the cut-out piece to reclose the vessel. This method is very time-consuming and requires retesting of the vessel after welding. Additionally, in many cases an operation to relieve the metal stress caused by welding is also necessary.

Another scheme is to use a vessel hatch assembly, which includes a heavy reinforcing ring, or coaming, to which a hatch cover is fastened in one of several ways. The disadvantages of this closure method are that the hatch consumes considerable space and the hatch locking apparatus is usually elaborate, requiring many large bolts or similar fasteners. A third method is to make the entire head of the pressure vessel removable. In this case, a massive locking ring extending around one or both parts of the vessel is required, and many bolts or other fasteners must be used. As in the second method, this method is relatively expensive.

It is therefore an object of this invention to provide means for closing an opening in a pressure vessel with minimum increase in total vessel weight and bulk.

A further object of this invention is to provide means for closing a vessel opening without sacrificing vessel strength or the tightness of the seal between the vessel and the closure.

A still further object of the invention is to provide a vessel closure which may be located in any portion of a spherical vessel surface and which is readily accessible and adapted for easy reclosure.

These and other objects of the invention are attained by providing a closure comprising a ring attached to the vessel at the periphery of the opening and including a pair of generally coaxial wide angle conical surfaces extending therearound and spaced apart relative to the radius of curvature of the vessel or closure. These conical surfaces are connected by a cylindrical surface. A closure plate includes conical and cylindrical surfaces along its periphery complementary to the respective conical and cylindrical surfaces of the ring attached to the pressure vessel. The plate and ring may then be joined or fastened together in any suitable manner.

For a better understanding of the invention, reference may be made to the following detailed description, and to the drawings, in which.

Figure 1:
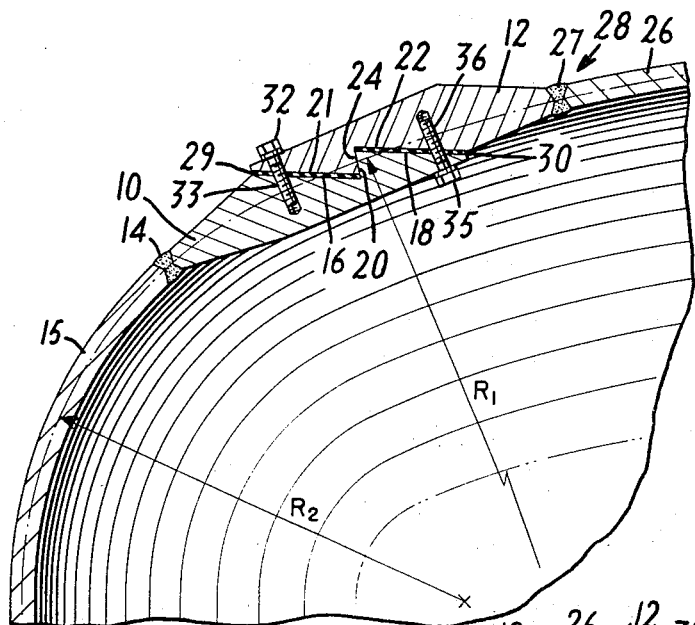
FIGURE 1 is a cross section through a fastening apparatus in accordance with the invention.
Figure 3:
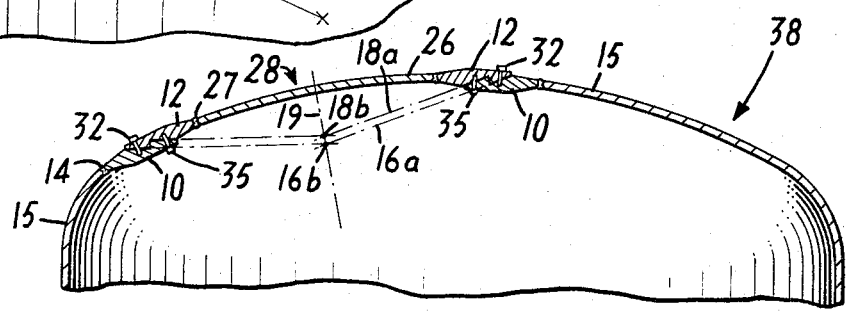
FIGURE 3 is a cross section of the vessel taken along line 3—3 in FIGURE 2.
Figure 2:
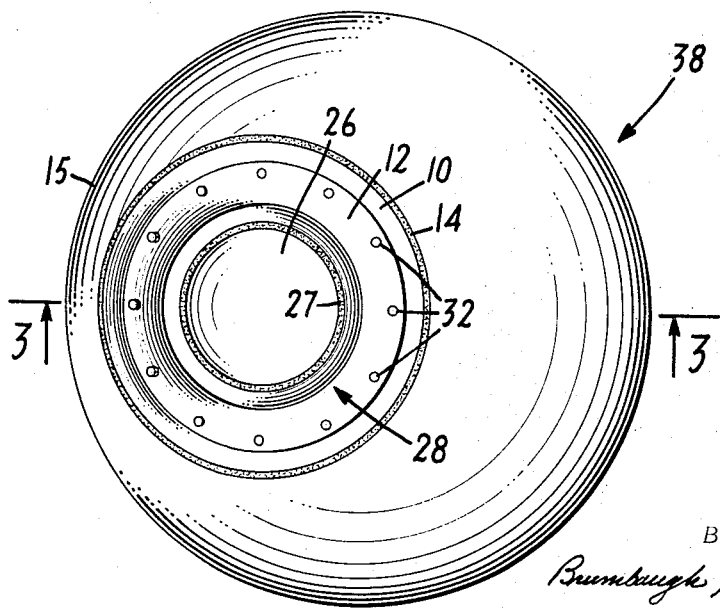
FIGURE 2 is a plan view of a pressure vessel employign an apparatus of the type illustrated in FIGURE 1, showing a typical closure location on the vessel.

Referring now to FIGURES 1 and 2, the apparatus, hereinafter referred to as a lock scarf, includes a pair of interfitting, or interlocking, rings 10, 12, through which an enlarged cross-section is taken in FIGURE 1. A weld joint 14 attaches the ring 10 to the vessel 15 through which the opening to be closed extends. Formed at the top of the ring 10 are a pair of coaxial wide angle conical surfaces 16, 18 which, as seen in FIGURE 3, may lie in the surfaces of cones defined by revolution of the line generatrices 16a, 18a about the respective centers 16b, 18b on the common axis line 19 extending perpendicularly to the vessel surface. Connecting these two conical surfaces 16, 18 is a cylindrical surface 20, also extending around the ring 10.

The second ring 12 is similar to the ring 10, but lies in inverted relation thereto. This ring 12 is similarly formed with the pair of conical ring surfaces 21, 22 and a cylindrical surface 24 which are complementary to the surfaces 16, 18, 20, respectively, of the lower ring 10. The second ring 12 is closed by a portion 26 of the vessel 15 at a weld joint 27 to form a closure plate 28.

Between the complementary conical ring surfaces 16, 21 is a sealing gasket 29 for ensuring a pressure-tight match between the respective rings 10, 12 of the lock scarf. A similar gasket 30 is shown between the conical surfaces 18, 22. It is also possible to effect a seal between the closure plate 28 and the ring 10 by means of an O-ring seal in place of the gaskets 29, 30.

Any suitable means can be utilized for joining the two rings 10, 12. A representative fastening arrangement is illustrated. This includes bolts 32 extending through the top ring 12 and into tapped holes 33 in the lower ring 10. Similarly, bolts 35 extend through the lower ring 10 into tapped holes 36 in the upper ring 12. The particular bolting or fastening arrangement used will depend, of course, on the particular vessel structure and the ease of access to the fasteners.

In conventional closure joints of this general type, the load is carried by bolts when the vessel is subjected to internal or external pressures. In the lock scarf shown, however, most of the load is borne by the cylindrical surfaces 20, 24 which intersect the respective conical surfaces 16, 18 and 21, 22 at acute angles. Thus, the portions of the lock scarf 10, 12 between the cylindrical surfaces 20, 24 and the respective weld joints 14, 27 are subjected to tension and support most of the load resulting from pressure applied from within the vessel 15, whereas the bolts 32, 35 are exposed to only nominal tensile forces.

FIGURES 2 and 3 show a typical installation of the lock scarf of FIGURE 1 in the head of a pressure vessel. As shown, the vessel ring 10 and closure plate 28 may be located in any part of the spherical portion of the pressure vessel head 38 defined by the radius $R_1$. Also, as observed best from FIGURE 1, the ring 10 can be located partially in the vessel surface described by the shorter corner radius $R_2$. In an elliptical vessel head, the circular lock scarf rings shown should be positioned coaxially with an axis of the ellipse. However, special locations are possible by forming the rings 10, 12 to conform to the portion of the vessel surface to be closed.

The invention thus provides means for closing large, as well as smaller openings in metal vessels and the like and is applicable to flanged, dished, hemispherical, or torospherical vessel heads. Moreover, in accordance with the invention, the lock scarf eliminates all the aforementioned disadvantages of known closure apparatus.

The embodiments of the invention described herein are representative only, and many modifications and variations, both in form and detail, may be made therein within the skill of the art. All such modifications and variations, therefore, are intended to be included within the spirit and scope of the appended claims.

I claim:

1. Apparatus for closing an opening in a curved pressure vessel comprising means forming along the periphery of the opening a pair of generally coaxial conical surfaces, a cylindrical surface connecting said conical surfaces, a closure plate having a pair of conical surfaces and a cylindrical surface along its periphery complementary to and fitting said conical surfaces and cylindrical surface of the ring, and means to fasten the closure plate to the periphery of the opening.

2. Apparatus as set forth in claim 1 wherein said cylindrical surfaces form acute angles with their respective conical surfaces.

3. Apparatus as recited in claim 1 wherein the conical surfaces and cylindrical surfaces intersect a surface described by the radius of vessel curvature.

4. Apparatus as defined in claim 1 in which said periphery and closure plate have holes extending at least partially therethrough and intersecting said conical surfaces at acute angles, and further comprising fastening means adapted for insertion in said holes for engaging said periphery and closure plate.

5. Apparatus according to claim 1, together with a ring gasket adapted to lie between said complementary surfaces.

6. Apparatus in accordance with claim 1 wherein the conical surfaces are defined by the revolution of line generatrices about centers lying interiorally of the vessel on a common axis extending generally perpendicularly to the curvature of the vessel.

References Cited

UNITED STATES PATENTS 3,311,253   3/1967   Perchacek _____ 220—3

THERON E. CONDON, *Primary Examiner.*

GEORGE T. HALL, *Examiner.*